April 12, 1927.  A. O. HURXTHAL  1,624,735
RACK DRIER FOR BRAKE LININGS AND OTHER STRIP MATERIAL
Filed Feb. 4, 1927    2 Sheets-Sheet 2

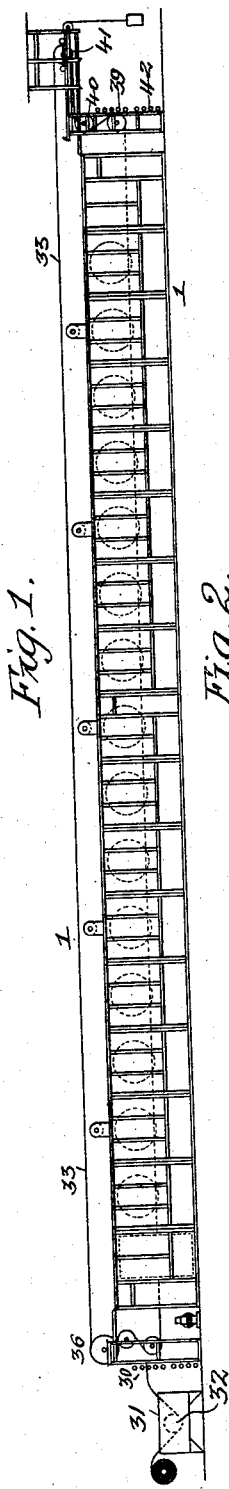

Inventor:-
Alpheus O. Hurxthal
by his Attorneys,

Patented Apr. 12, 1927.

1,624,735

UNITED STATES PATENT OFFICE.

ALPHEUS O. HURXTHAL, OF PHILADELPHIA, PENNSYLVANIA, ASSIGNOR TO PROCTOR & SCHWARTZ, INCORPORATED, OF PHILADELPHIA, PENNSYLVANIA, A CORPORATION OF PENNSYLVANIA.

RACK DRIER FOR BRAKE LININGS AND OTHER STRIP MATERIAL.

Application filed February 4, 1927. Serial No. 165,922.

One object of my invention is to provide means for properly drying fabric strip material, such as brake-linings, which are usually narrow and of considerable length.

A further object of the invention is to provide means for drawing the brake-linings into the drier after being impregnated.

While the invention is particularly adapted for use in drying brake-linings, it will be understood that it can be used for drying other fabrics in strip form.

In the accompanying drawings:

Fig. 1 is a diagrammatic side elevation of my improved drier for brake-linings and like material;

Fig. 2 is an enlarged longitudinal section of the front end of the drier;

Figure 3:
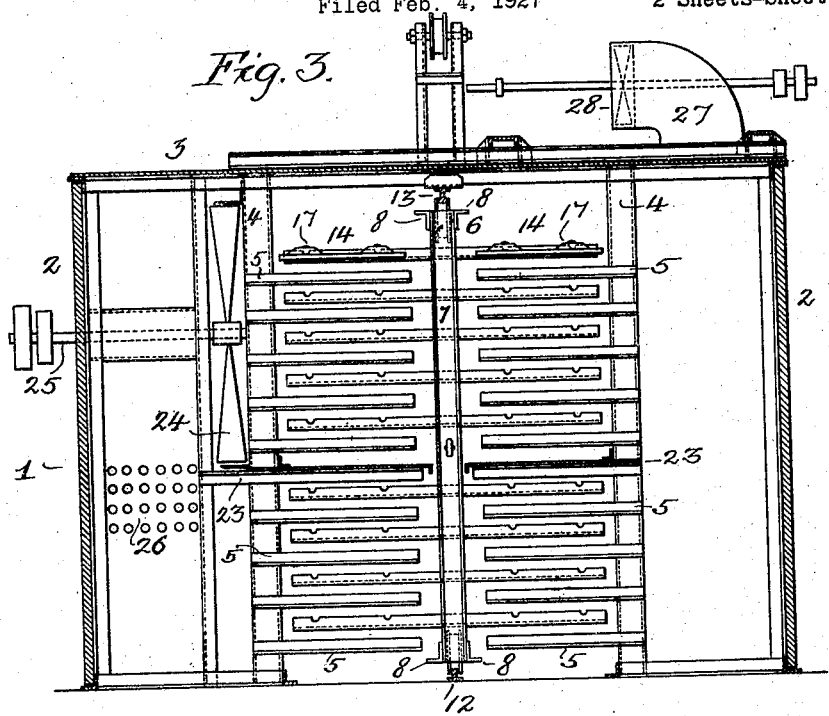
Fig. 3 is a transverse section on the line 3—3, Fig. 2.

1 is the casing of the drier, which may be of any length desired, and this casing in the present instance has side walls 2 and a top 3. Within the drier are uprights 4—4, to which are attached the horizontal arms 5 spaced a given distance apart and which form the rack upon which the material is to be dried. These arms are angular in shape, one set of arms projecting towards the centre of the drier from one of the uprights 4, and the other set projecting towards the center of the drier from the other upright 4, leaving a clear space for the passage of the body of the truck 6.

The body 7 of the truck 6 is narrow, being made of structural framework as indicated in Fig. 2, and has angular bars 8 at top and bottom to which the bearings 9 are secured.

The spindles for the grooved wheels 10 are mounted in the lower bearings, and the spindles for the grooved wheels 11 are mounted in the upper bearings. The lower wheels 10 travel on a central longitudinal track 12, and the upper wheels travel under an overhead track 13 secured to the roof of the structure.

Figure 4:
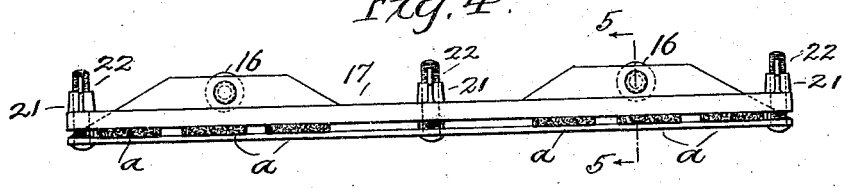
Fig. 4 is an enlarged detached view of the clamp showing the series of brake-linings in position.
Figure 5:
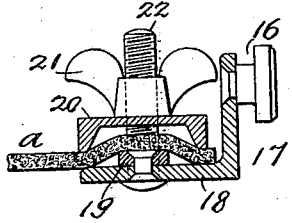
Fig. 5 is an enlarged sectional view on the line 5—5, Fig. 4.
Figure 6:
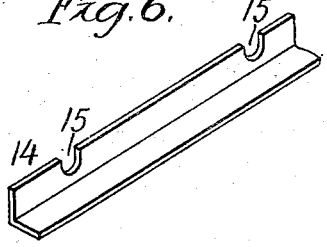
Fig. 6 is a detached perspective view of a portion of one of the horizontal arms of the truck.

On the truck 6 are horizontal arms 14 which extend from each side of the body portion 7, and alternate with the horizontal fixed arms 5 on which the material is dried as illustrated in Fig. 3. The arms 14 are made of angle bar as shown in Fig. 6 and are notched at 15 to receive the buttons 16 on the clamp 17 (Figs. 4 and 5).

Each clamp is made of an angle bar 18 to which the buttons 16 are secured, and the horizontal portion of the angle bar has a rib 19 either secured to or formed integral with the bar 18. 20 is the clamping member, recessed at its underside so as to span the projecting rib 19. This construction crimps the end of the brake-lining a when it is pressed down by the thumb-nuts 21 on the screws 22, and securely holds the end of the brake-lining to the clamp, and as the clamp is attached to the carriage the strips of the brake-lining will be drawn into the drier when the carriage is moved longitudinally.

In the drier in the present instance are horizontal partition-plates 23, which are located about midway of the drier and extend towards the centre of the drier, being spaced a sufficient distance apart to clear the body portion 7 of the truck 6. These horizontal partitions 23 extend the full length of the drier so that when the circulating fans 24, which are mounted on the shaft 25, are in motion, the air is circulated around the partitions 23.

In the drier are heating coils 26 for heating the air in circulation. The fans may be of any suitable type, and the means for heating the air in circulation may be modified without departing from the essential features of the invention.

In the upper end of the drier are exhaust pipes 27, having fans 28 for exhausting the air at one or more points in the drier.

The feed end of the drier is open and in front of the opening 29 are a series of rollers 30, over which the brake-lining passes from the impregnating tank 31 shown in Fig. 1.

The coils of the brake-lining are placed in front of the tank and the clamps are secured to one or more coils, the strips of brake-lining being passed under the submerging roller 32 and then over the rollers 30. The clamp is carried forward and fastened onto one of the arms of the truck. In practice, two clamps are used, one of said clamps being secured to an arm 14 on one side of the centre, and the other clamp being secured to the arm on the other side of the centre.

Motion is imparted to the truck by means of an endless rope 33, one end of the rope being attached to an eye on one end of the truck, and the other end of the rope being attached to an eye 35 at the other end of the truck. The rope passes around grooved wheels 36, 37 and 38 at the forward end of the drier, and around grooved wheels 39 and 40, and around a take-up roller 41 at the discharge end of the drier. At this discharge end are rollers 42 similar to the rollers 30, over which the brake-lining is drawn when removed from the drier.

The operation is as follows:

The number of ends of the brake-lining are secured to the clamp, and the brake-lining with the clamp is passed through the impregnating tank, and then attached to one of the arms of the carriage. Usually two clamps are used, to which two series of brake-lining strips are secured. The wheel 36 is a driven wheel, and in the present instance is driven from a shaft 43 through a worm and worm-gear shown in dotted lines in Fig. 2.

The carriage is then set in motion, and as it moves forward it draws the strips of brake-lining over the series of horizontal plates directly below the arms of the carriage, and when the carriage has reached the opposite end of the drier, then the clamps are detached and the strips of brake-lining are supported entirely by the fixed arms 5.

The brake-lining is then clear of the arms of the carriage and the carriage can be returned to the feed end of the drier, and another series of brake-lining strips can be attached to the clamps, which in turn are attached to another arm of the carriage and drawn through the drier in the manner described above.

The drier can be loaded either from the bottom to the top or from the top to the bottom, as desired. When the drier has been filled, the ends of the drier are closed by suitable doors, the truck remaining in the drier, preferably at the feed end thereof, and after evaporation of the gasoline, the delivery end of the drier is opened and the strips of brake-lining are drawn out for further processing.

When the truck reaches the delivery end of the drier, it may be automatically stopped by any suitable apparatus and then returned to the feed end after the clamps have been removed. In the construction shown, the truck remains in the drier at all times, but this is not essential.

The drawings show a series of cross-arms fixed to the truck. In some instances only one cross-arm may be used, and this can be moved up and down the face of the truck to any desired position, as it is the general practice to only draw one tier of brake-linings at a time, although in some instances when it has been found desirable to draw more than one, the cross-arm may be made double if desired.

The truck is preferably driven by an individual motor and has an automatic-magnetic reversing switch so that the truck can be stopped, started, or reversed from certain control stations placed conveniently for the operator. In addition to this, two stop switches are provided, one at each end of the drier so that the truck is automatically stopped when it reaches extreme travel in either direction. While the automatic means is preferable, it is not absolutely necessary as the truck may draw the material into the drier and may be stopped by hand.

I claim:—

1. The combination in a drier for drying strip material, of a casing having a series of horizontal supporting arms for the material to be dried; a truck arranged to travel longitudinally into the drier; and means for attaching one or more strips of material to the truck, so that when motion is imparted to the truck it will draw the strips into the drier and over the fixed supporting arms.

2. The combination in a drier, of a casing having a series of supporting arms for the material to be dried; a truck; means for traversing the truck longitudinally through the drier, said truck having arms; clamps; and means for attaching strips of material to be dried to the arms of the truck so that when motion is imparted to the truck the material will be drawn over the fixed supporting arms within the drier.

3. The combination in a drier for strip material, of a casing having a series of fixed horizontal supporting arms projecting from each side and stopping short of the centre of the drier; a truck having a body portion arranged to travel in the open centre of the drier; longitudinal rails for guiding the truck; arms on the truck extending on each side of the centre thereof and above the fixed supporting arms; means for imparting motion to the truck; and means for attaching strip material to the arms of the truck so that when the truck is traversed through the drier the strips will be drawn into the drier and will rest upon the fixed arms.

4. The combination in a drier for strip material, of a longitudinal casing; means for circulating air in the casing; a series of fixed horizontal supporting arms for the material projecting from each side of the casing towards the centre thereof, said arms stopping short of the middle so as to provide a free passage; a truck having a body portion located in the casing and between the fixed horizontal arms, and having a series of horizontal arms projecting from the side of the body portion and alternating with the fixed arms of the casing; means for imparting motion to the truck; and means for securing the strip material to the arms of the truck so that when the truck is moved from one end of the casing to the other the material will be drawn into the casing and will rest upon the fixed arms.

5. The combination in a drier for strip material, of a casing; a drying chamber therein; a series of horizontal arms in the drying chamber; means for circulating air in the drying chamber; means for heating the air; openings at each end of the drier; a series of rollers at the openings; a truck arranged to move longitudinally in the drying chamber; and means on the truck to which the strips to be dried are secured so that the strips as they are drawn in the drying chamber will pass over the rollers at the feed end of the drier and when drawn into the drier will rest upon the horizontal supporting arms.

6. The combination in a drier having a drying chamber, of a series of horizontal arms spaced apart within the drier; a truck; longitudinal rails upon which the truck travels; an impregnating tank at the feed end of the drier; means for causing the strip of material to be passed into the tank prior to entering the drying chamber; and means on the carriage for engaging the strip material and drawing it through the tank and into the drying chamber of the drier.

7. The combination in a strip drier, of a casing; a series of horizontal arms within the casing; a carriage having arms extending over the fixed horizontal arms of the casing; clamps; means for securing the clamps to the strip material; and means for detachably mounting the clamps on the arms of the carriage.

8. The combination in a drier, of a casing enclosing a drying chamber; a series of horizontal arms in the drying chamber; a carriage having arms extending over the horizontal arms of the casing, the arms of the carriage being notched; a clamp having buttons arranged to enter the notches in the arms; and means for detachably securing the strip material to the clamps.

ALPHEUS O. HURXTHAL.